US006310965B2

United States Patent
Murai

(10) Patent No.: US 6,310,965 B2
(45) Date of Patent: *Oct. 30, 2001

(54) MANUSCRIPT DOCUMENT DETECTING SYSTEM AND METHOD

(75) Inventor: Toshiharu Murai, Kawasaki (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/102,384

(22) Filed: Jun. 22, 1998

(30) Foreign Application Priority Data

Jun. 20, 1997 (JP) .................................................. 9-179092
Jul. 11, 1997 (JP) .................................................. 9-186239

(51) Int. Cl.$^7$ ........................................................ G06K 9/00
(52) U.S. Cl. .......................................... 382/112; 250/559.1
(58) Field of Search .................................. 382/112, 289, 382/290, 291, 292, 254; 355/403, 206, 208, 271; 358/406; 369/44.32

(56) References Cited

U.S. PATENT DOCUMENTS

| | | | |
|---|---|---|---|
| 5,027,417 | * 6/1991 | Kitakado et al. | 382/8 |
| 5,130,748 | * 7/1992 | Namizuka et al. | 355/206 |
| 5,327,252 | * 7/1994 | Tsuruoka et al. | 358/406 |
| 5,652,743 | * 7/1997 | Takamine et al. | 369/44.32 |
| 5,764,813 | * 6/1998 | Murayama et al. | 382/271 |
| 5,892,852 | * 4/1999 | Namizuka et al. | 382/254 |

* cited by examiner

Primary Examiner—Joseph Mancuso
Assistant Examiner—Abolfazl Tabatabai
(74) Attorney, Agent, or Firm—Oblon, Spivak, McClelland, Maier & Neustadt, P.C.

(57) ABSTRACT

A manuscript document detecting system and method, wherein a rotatable body having a scanning mirror surface is rotated by a motor, and thereby light emitted from an light-emitting-diode (LED) is guided to a surface of a manuscript document. The rotatable body directs, toward a photo-diode (PD), light reflected from the manuscript document and a light-reflection processing device on a rear surface of an outer frame of a manuscript document mounting stand generates a light receiving signal. The rotatable body further includes an encoder having a row of slits mounted on a circular disk. When the slits pass through a photo sensor, pulse signals are output therefrom. Disturbance light reflected when a pressing plate, which holds the manuscript document against the mounting stand, is lifted generates a light receiving signal of a 75% duty cycle. The reflected light from the manuscript document generates a light receiving signal of a 25% duty cycle. The light source is turned on and off or power-modulated with a predetermined period and duty cycle, and the size and position of the manuscript document is detected by use of only the light receiving signal coinciding with the period and the duty cycle of the manuscript document.

26 Claims, 13 Drawing Sheets

MANUSCRIPT DOCUMENT DETECTING SYSTEM AND METHOD

BACKGROUND OF THE INVENTION

1. Field of the Invention

The present invention relates to a manuscript document detecting system and method for use in a copying machine and/or a scanner, in particular, to a manuscript document detecting system and method for detecting a size and position of a manuscript document.

2. Discussion of Background

In recent years, various manuscript document detecting systems have been developed for detecting a size and position of a manuscript document in copying machines and/or scanners. Japanese Laid-open Patent Publication No. 2-308236 (1990) discloses a manuscript document detecting system capable of detecting a manuscript document size and position. In the disclosed system, when the closing of a device used for holding down a manuscript (e.g., a pressing plate) is detected, scanning is started, and a light-receiving signal from a light sensor is compared with a standard value. In this way, a determination is made of a presence or absence of the manuscript document. In such structure, the size and the positional shift of the manuscript document can be detected from scanning data at a time point when the state of the manuscript document changes from a state of being present to state of being absent and vice versa.

In another manuscript document detecting system, the manuscript document is scanned by radiating light toward the manuscript document from a lower portion of a document mounting stand. Light reflected from the manuscript document returning to an initial position is detected. In such an system, a standard signal representing a start of scanning light is provided and at that time counting of an internal clock is started. In this way, a measurement value representing a position of the scanning light is obtained. At a time of a first scanning, values of the measured scanning light position when first detecting the reflected light from the manuscript document and when finally detecting the reflected light from the manuscript document are processed as the data representing end positions of the manuscript document. In this way, the size and position of the manuscript document can be detected.

FIG. 8 is a graph for illustrating an example of an influence due to rotational unevenness of a motor used for scanning a manuscript document. In a method of optically scanning a manuscript document, it is generally required that a part of the optical system is rotated. However, it may be impossible to avoid errors due to rotational unevenness of the motor. For instance, as mentioned in the published specification of Japanese Laid-open Patent Publication No. 2-308236 (1990), if an element, such as an encoder, functioning mechanically in cooperation with the scanning system, is employed for measuring the position of the scanning light, although the rotational unevenness of the motor does not cause any problem theoretically, it is necessary to prepare a high-precision rotation detecting unit in order to obtain sufficient resolution for detecting the position and size of the manuscript document. Consequently, the manufacturing cost and complexity of the system are increased.

On the other hand, in a case where a measurement of scanning light position is performed by use of a clock in synchronism with the rotation of the motor, the cost may be decreased. However, a rotational unevenness of the motor directly exerts an influence upon such an system, and results in problems of precision. As shown in FIG. 8, the error due to the influence of the rotational unevenness of the motor is integrated (i.e., added up) and thereby increases as the scanning light is further from a starting position of scanning.

As previously discussed, a manuscript document detecting system has been developed wherein light is radiated toward a manuscript document and reflected light from the manuscript document is used to determine a size and position of the manuscript document. In Japanese Laid-open Patent Publication No. 2-308236 (1990), a manuscript document size and position detecting system is disclosed, wherein a closing of a device for holding down the manuscript document (e.g., a pressing plate) triggers a start of detection/scanning and a light receiving signal from a light sensor is compared with a standard value. In this way, a presence or absence of the manuscript document is determined so that the size and positional shift of the manuscript document is detected.

However, in such manuscript document detecting systems, since the reflected light includes light reflected not only from the manuscript document, but also may include other reflected light, such as from a device for holding down the document (e.g., pressing plate or ADF), body parts of an operator, etc., it may be necessary to distinguish light reflected from the manuscript document and from other sources in order to perform a precise detection of the size and positional shift of the manuscript document.

A method of detecting a manuscript document by detecting a distance utilizing a method of astigmatism may also be employed. Specifically, a focal point is set at a place optically more distant than a manuscript document mounting stand in view of the system main body. For instance, as shown in FIG. 12, light reflected from a manuscript document closer than the focal point is output as a positive voltage, while the light reflected from, for example, a pressing plate more distant from the focal point is output as a negative voltage. Only the positive voltage is detected as a binarized output signal RCV of the output light receiving signal PDO. In this figure, signal T9 represents a driving period for driving a light emitting source.

However, in such systems, as shown in FIG. 13, when light reflected from the pressing plate increases due to, for example, external disturbance light and/or the angle of the incident light, even though the scanning light is modulated and driven with a predetermined period, the disturbance light and the scanning light cannot be distinguished from each other. In this case, the duty cycle of the modulation/drive signal T9 is 50% for both the disturbance light and the light reflected from the manuscript document, as shown in FIG. 13, and the reflected light due to the disturbance light is improperly detected as light reflected from the manuscript document, resulting in manuscript document detection errors.

Furthermore, in systems which employ a device, such as an encoder, for detecting rotation of a motor used for driving an optical scanning system, influence exerted by rotational unevenness of the motor are not compensated, resulting in a system with reduced precision.

SUMMARY OF THE INVENTION

Accordingly, one object of the present invention is to provide an economical document detecting system with high detection accuracy and with minimal modifications to existing systems.

Another object of the present invention is to provide a manuscript document detecting system which employs an encoder having a resolution set so that influence due to rotational unevenness of a motor for driving an optical scanning system is reduced, resulting in a high-precision and cost effective system.

Another object of the present invention to to provide a manuscript document detecting system which compensates a resolution required for measuring a position of scanning light by counting clock signal cycles.

Another object of the present invention to provide a manuscript document detecting system with improved precision by distinguishing between light reflected from a manuscript document and light reflected from disturbance sources.

Another object of the present invention to provide a manuscript document detecting system with improved precision in detection of the manuscript document by use of only light reflected from a manuscript document by distinguishing between such reflected light and light reflected from disturbance sources as a function of duty cycles thereof.

The above and other objects are achieved according to the present invention by providing a new and improved manuscript document detecting system and method, wherein a rotatable body having a scanning mirror surface is rotated by a motor, and thereby light emitted from an light-emitting-diode (LED) is guided to a surface of a manuscript document. The rotatable body directs, toward a photo-diode (PD), light reflected from the manuscript document and a light-reflection processing device on a rear surface of an outer frame of a manuscript document mounting stand generates a light receiving signal. The rotatable body further includes an encoder having a row of slits mounted on a circular disk. When the slits pass through a photo sensor, pulse signals are output therefrom. Disturbance light reflected when a pressing plate, which holds the manuscript document against the mounting stand, is lifted generates a light receiving signal of a 75% duty cycle. The reflected light from the manuscript document generates a light receiving signal of a 25% duty cycle. The light source is turned on and off or power-modulated with a predetermined period and duty cycle, and the size and position of the manuscript document is detected by use of only the light receiving signal coinciding with the period and the duty cycle of the manuscript document.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
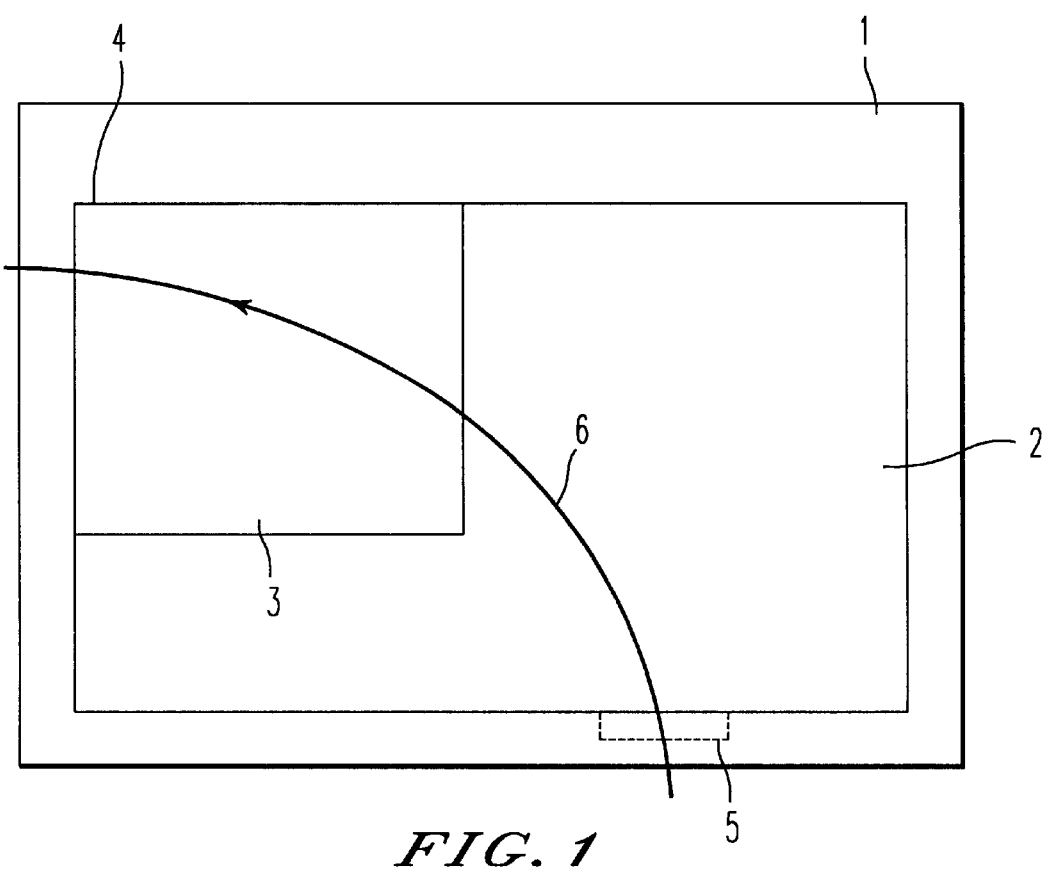
FIG. 1 is a structural diagram for explaining the manuscript document detecting system and method according to the present invention.

Referring now to the drawings, wherein like reference numerals designate identical or corresponding parts throughout the several views, and more particularly to FIG. 1 thereof, there is illustrated is a structural diagram for explaining the manuscript document detecting system and method according to the present invention.

In FIG. 1, there is illustrated an outer frame 1 of a manuscript document mounting stand 2 (e.g., glass plate), a manuscript document 3, a standard point 4 on with which the manuscript document 3 is aligned, a light reflection and processing section 5, and an orbit or trajectory for light scanning 6. The manuscript document 3 is typically placed at a standard point 4 and the system detects a size of the manuscript document 3 by measuring a position of ends of the manuscript document 3 based on scanning light from the light reflection and processing section 5 as it traverses the manuscript document 3, as will be later described.

Figure 2A:
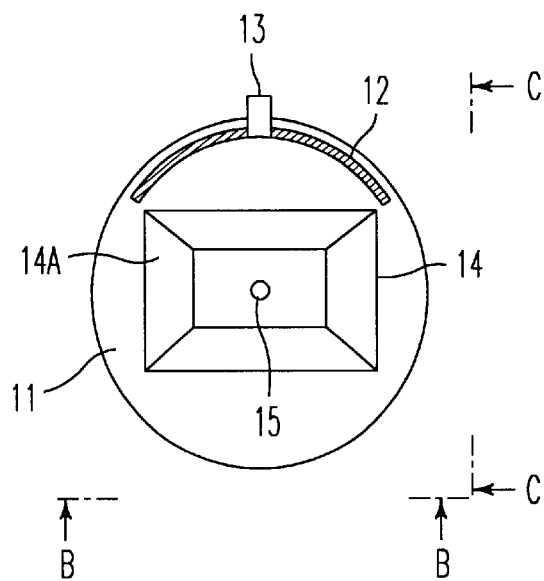
FIGS. 2a–2c are structural diagrams illustrating a portion of the manuscript document detecting system according to the present invention.
Figure 2B:
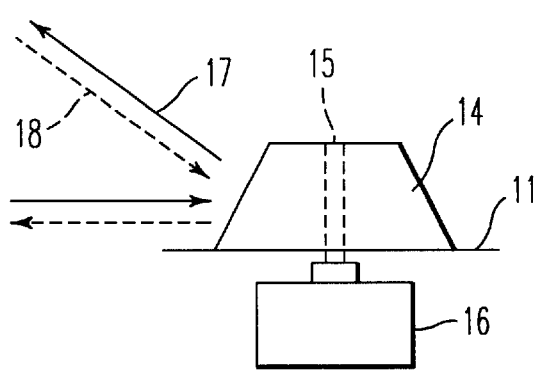
Figure 2C:
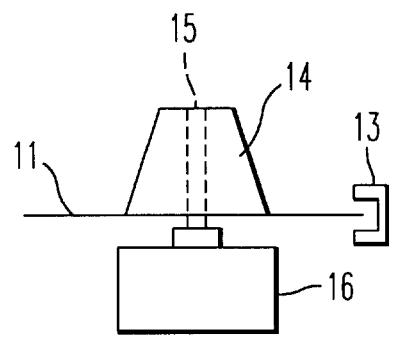

FIGS. 2a–2c are structural diagrams illustrating a portion of the manuscript document detecting system and method according to the present invention. FIG. 2a is a plan view, FIG. 2b is a cross sectional view taken along line B-B of FIG. 2a, and FIG. 2c is cross sectional view taken along line C—C of FIG. 2a. In FIGS. 2a–2c, the portion of the system includes a disk 11, a row of slits 12 provided on the disk 11, a photo sensor 13, a rotatable body 14, a scanning mirror surface 14a, a rotating shaft 15, a motor 16, scanning light 17, and reflected light 18.

In FIGS. 2a–2c, the rotatable body 14, having a predetermined surface 14a formed as a mirror, is mounted on the rotating shaft 15 of the motor 16 and rotated thereby. The light 17, emitted from an LED (not shown), is guided onto the surface of the manuscript document 3 (FIG. 1). The rear surface of the manuscript document mounting stand 2 is scanned from an underside thereof with the scanning orbit 6 as shown in FIG. 1. A reflection part treated so as to reflect light (e.g., by providing white tape on the manuscript document 3 or the rear surface of the outer frame 1 of the manuscript document mounting stand so that a positional portion having positional precision relative to the manuscript document mounting standard point 4 is ensured), that is, a light reflection processing section in provided in the system.

The rotatable body 14 guides the light reflected on the light reflection processing section and returning therefrom to a photo diode (PD, not shown). Furthermore, an encoder (e.g., standard pulse generator) having slits 12 of a predetermined number are provided at predetermined positions and at predetermined intervals on the disk 11. When slits 12 pass through the space between the photo sensor 13, a pulse signal is output.

Figure 3:
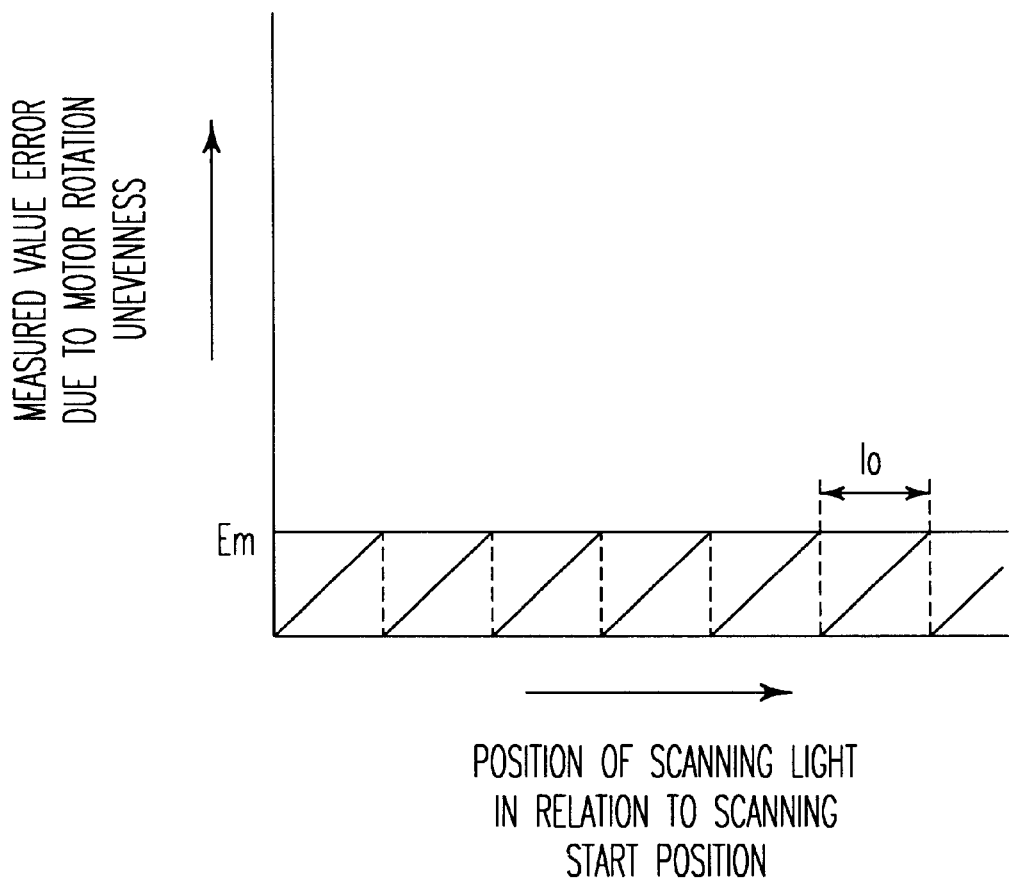
FIG. 3 is graph for explaining influence due to rotational unevenness of a motor of the manuscript document detecting system and method according to the present invention.
Figure 8:
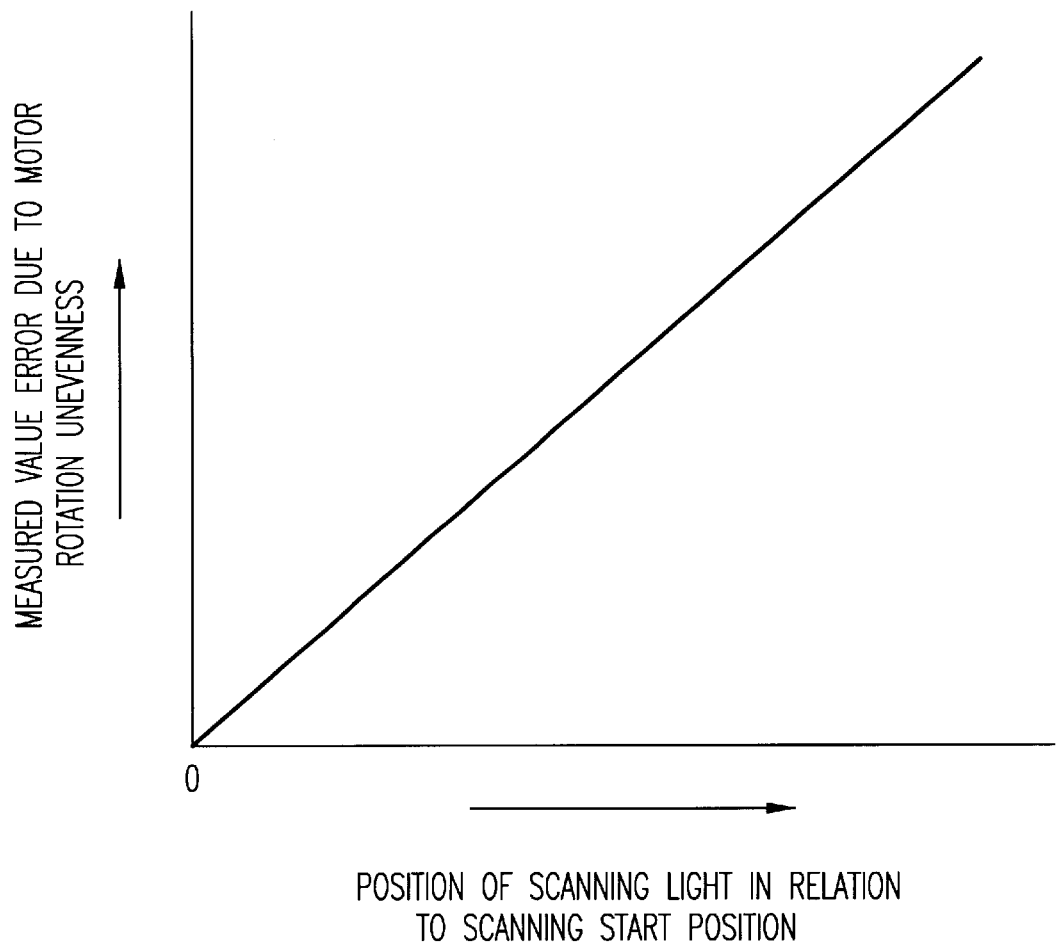
FIG. 8 is a graph for explaining influence due to rotational unevenness of a motor in a manuscript document detecting system.

FIG. 3 is graph for explaining influence due to rotational unevenness of a motor of the manuscript document detecting system and method according to the present invention. In FIG. 3, Em represents a tolerable error value and lo represents a distance of the encoder output. The value of the encoder's resolution is chosen so as to tolerate the precision of the influence due to the rotational unevenness of the motor. The resolution of the encoder required for measuring the position of the scanning light is compensated by a counting value of a clock signal. Consequently, the error due to the influence of the motor's rotational unevenness can be reduced, as shown in FIG. 3 and as compared to the errors due to the influence of the motor's rotational unevenness shown in FIG. 8.

Figure 4:
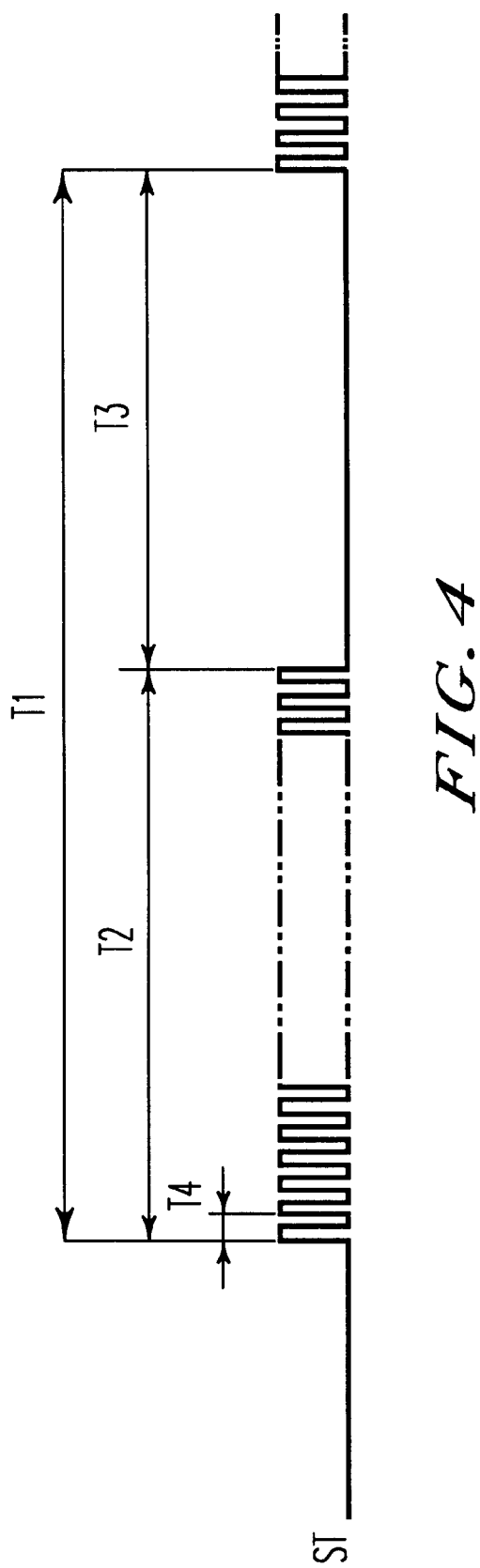
FIG. 4 is a timing diagram illustrating an encoder output signal in the manuscript document detecting system and method according to the present invention.

FIG. 4 is a timing diagram illustrating an encoder output signal ST in the manuscript document detecting system and method according to the present invention. In FIG. 4, T1 represents a rotation period of the motor 16 (FIGS. 2a–2c), T2 is the period when a portion of the disk 11 with the slits 12 passes through the space between the photo sensor 13, and T3 is the period when no slits 12 pass through the space between the photo sensor 13. When the slits 12 pass through the photo sensor 13, light passes through the slits 12 and the photo sensor 13 outputs signal ST with a logic high "H" pulses having a period T4 within period T2 of FIG. 4.

Figure 5:
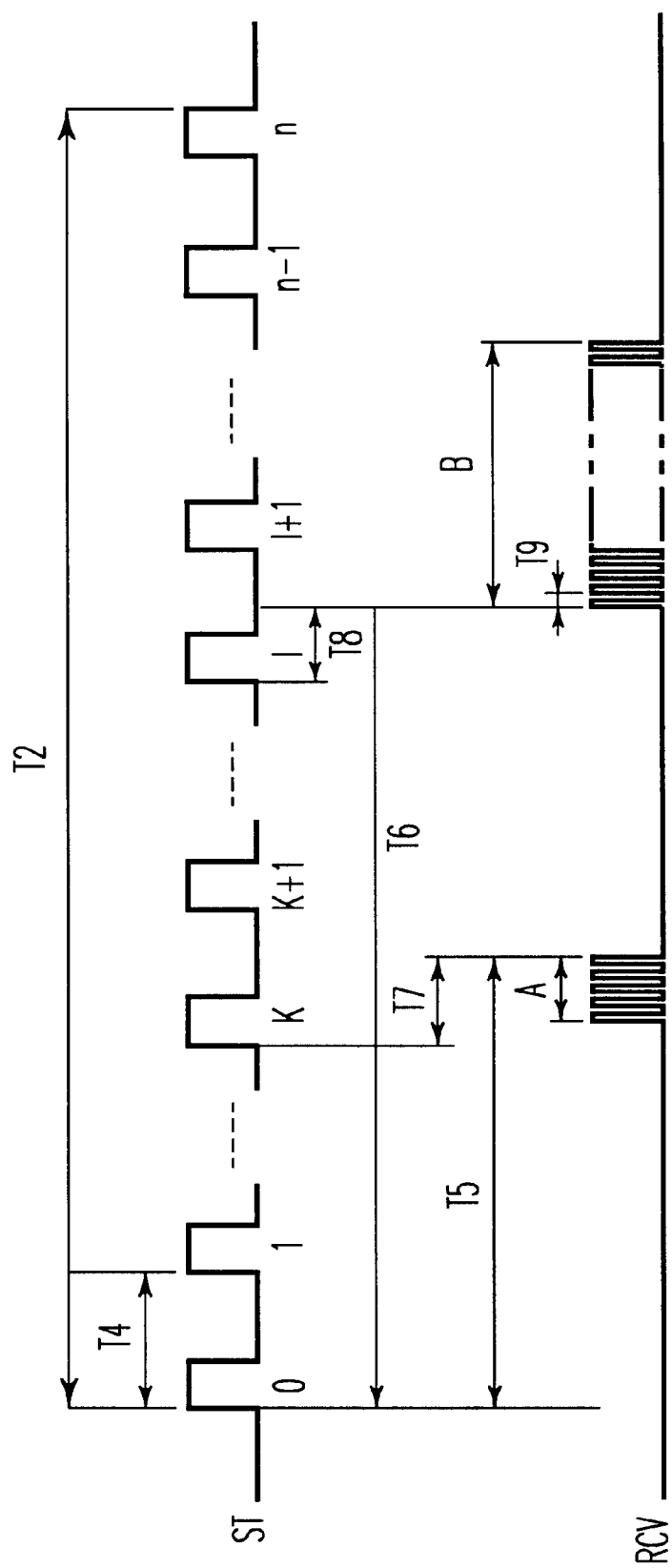
FIG. 5 is a timing diagram illustrating a relationship between an encoder output signal and a light-receiving output signal of the manuscript document detecting system and method according to the present invention.

FIG. 5 is a diagram (timing chart) for explaining the relationship between the output signal ST of the encoder in the manuscript document detecting system according to the present invention and the light-receiving output signal RCV. In FIG. 5, T4 is a pulse interval of the output signal ST, T5 is a time period from a generation of the head pulse in the signal ST until an arrival of scanning light at the manuscript document mounting stand 2 (FIG. 1), T6 is a time period from the generation of the head pulse in the signal ST until the arrival of the scanning light at the manuscript document 3 (FIG. 1), T7 is a time period for measuring of a count value of a clock signal during the time period T5, T8 is a time period for measuring a count value of the clock signal during the time period T6, and T9 is a pulse cycle of the light-receiving output signal RCV for driving the LED (as described with respect to FIGS. 2a–2c).

Figure 6:
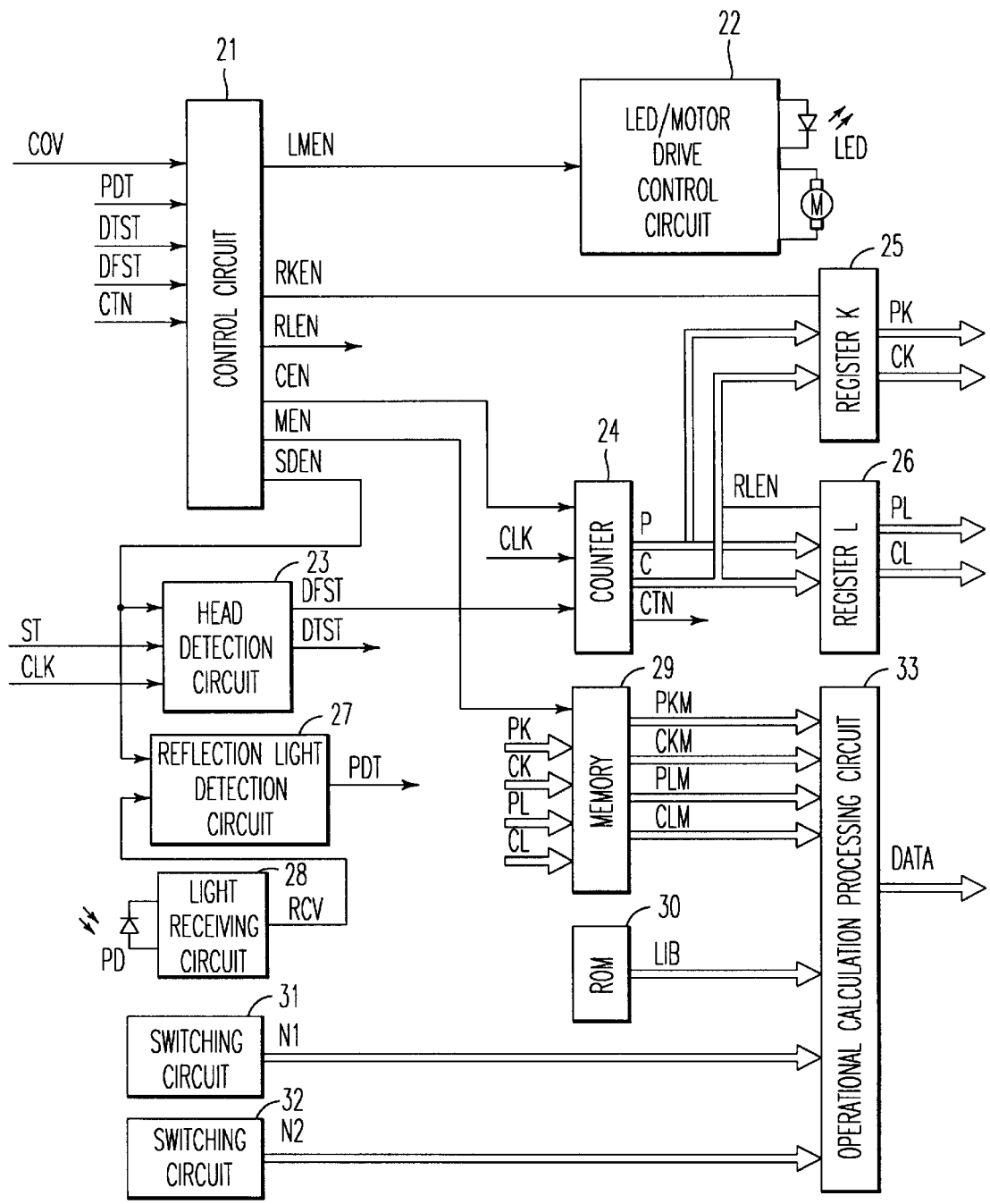
FIG. 6 is a circuit diagram illustrating an embodiment of the manuscript document detecting system according to the present invention.

FIG. 6 is a circuit diagram illustrating an embodiment of the manuscript document detecting system according to the present invention. In FIG. 6, the system includes a control circuit 21, an LED/motor drive control circuit 22, a head detection circuit 23 receiving the signal ST, a counter 24, a K register 25, an L register 26, a reflection light detection circuit 27, a light receiving circuit 28, a memory 29, a ROM 30, switching circuits 31 and 32, and a processing circuit 33 for performing processing calculations.

Figure 7:
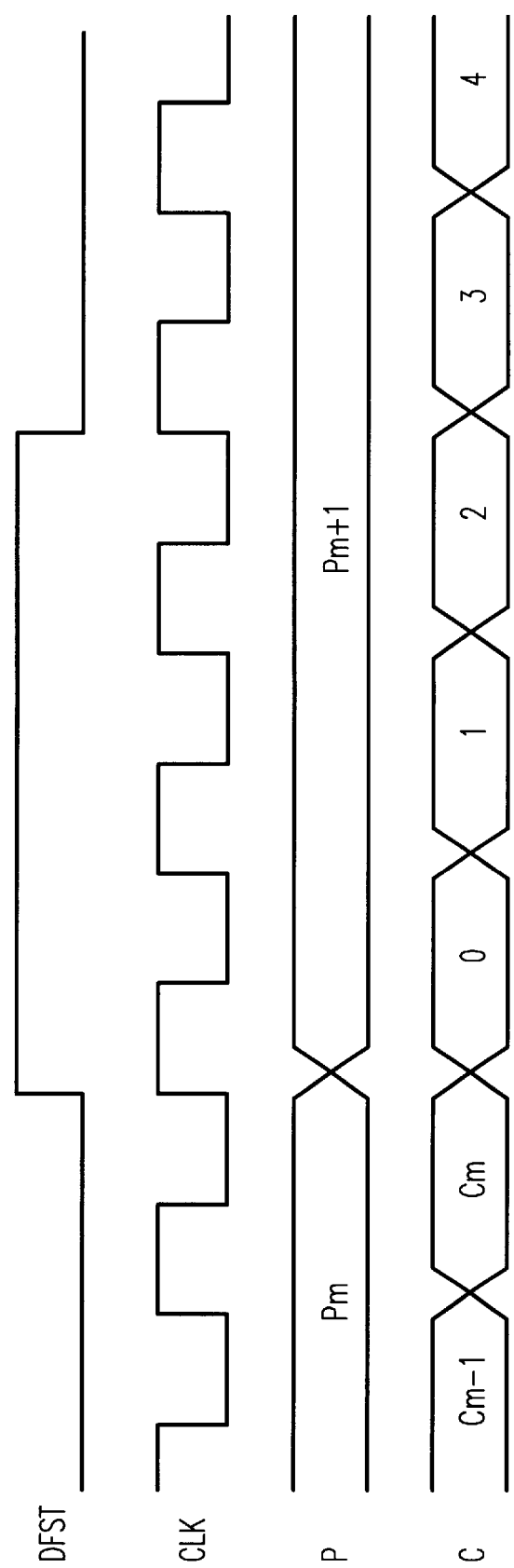
FIG. 7 is a timing diagram illustrating signal relationships in the embodiment of the manuscript document detecting system shown in FIG. 6.

FIG. 7 is a timing diagram illustrating signal relationships in the embodiment of the manuscript document detecting system shown in FIG. 6. The system operation will now be described with reference to FIGS. 6 and 7.

In FIG. 6, when the control circuit 21 determines that the device for holding down the manuscript document (e.g., a pressing plate) is in an open state via a signal COV, the circuit 21 generates a logic "H" on signal line LMEN which starts an operation of the LED/Motor drive control circuit 22. When the signal LMEN is at a logic "H", the control circuit 22 causes the LED to emit light with the period T9 and causes the motor to rotate.

The control circuit 21 generates a logic "H" on signal line SDEN which starts the operation of the head detection circuit 23 and the reflection light detection circuit 27. When the head detection circuit 23 starts operation, a first rising edge transition during period T3 in the encoder output signal ST (FIG. 4) is detected and the circuit 23 generates a logic "H" on signal line DTST. The DTST signal remains at a logic "H" state until the SDEN signal becomes a logic "L". Hereupon, the ST signal is synchronized with the clock signal CLK and is output as signal DFST.

The light receiving circuit 28 converts the light signal emitted from the LED and received by the photo diode PD to an electric signal and amplifies the converted signal. The circuit 28 further binarizes the signal thus converted and amplified with a predetermined threshold value. When the signal exceeds the threshold value, the circuit 28 outputs the signal RCV as a logic "H" value.

When the reflection light detection circuit 27 detects the LED light reflected from the manuscript document, via the signal RCV, during the time period in which the SDEN signal is in a logic "H" state, the circuit 27 generates a logic "H" on the signal line PDT. When the signal DTST becomes a logic "H", the control circuit 21 generates a logic "H" on the signal line CEN which starts the operation of the counter 24. The counter 24 counts rising-edge transitions of the signal DFST and the clock signal CLK, and outputs respective counting value signals P and C as shown in FIG. 7. In FIG. 7, the counting value C of the CLK signal is cleared to zero each time the counting value P of the signal of DFST is incremented, and the counting of the clock signal via signal C then resumes.

Furthermore, when the signal DTST becomes a logic "H", the control circuit 21 generates a logic "H" on the signal line RKEN which allows the P and C count values of the counter 24 to be written into register 25. The register 25 renews the stored signals P and C of the counter 24 during the period when the signal RKEN is at a logic "H", and continues to allow the P and C count values of the counter 24 to be written into register 25.

When the control circuit 21 detects a falling-edge transition of the first signal PDT after the signal DTST becomes a logic "H", that is, the completion of timing portion A shown in FIG. 5, the circuit 21 generates a logic "L" on the signal RKEN. Namely, by performing the above operation, the values measured during the time period T5 shown in FIG. 5 turn out to be respectively the registered values PK and CK in register 25.

Next, after the signal RKEN transitions to a logic "L", the control circuit 21 generates a logic "H" on the signal line RLEN which allows the P and C count values of the counter 24 to be written into register 26. The register 26 renews the stored signals P and C of the counter 24 during the period when the signal RLEN is at a logic "H", and continues to allow the P and C count values of the counter 24 to be written into register 26.

When the control circuit 21 detects a rising-edge transition of the first signal PDT after the signal RKEN becomes a logic "L", that is, the beginning of the timing portion B shown in FIG. 5, the circuit 21 generates a logic "L" on the signal line RKEN. Namely, by performing the above operation, the values measured during the time period T6 shown in FIG. 5 turn out to be respectively the registered values PL and CL in register 26.

When the counter 24 counts the rising-edge transitions of the signal DFST (n−1) times, the counter 24 generates a logic "H" on the signal line CTN which causes the control circuit 21 to generate a logic "L" on both the signals CEN and SDEN which resets the counter 24, the head detection circuit 23, the reflection light detection circuit 27, etc. Furthermore, at this time, in a case where the pressing plate is in an open state, circuit 21 pulses a logic "H" on the signal line MEN and the values stored in the registers 25 and 26 are stored in the memory 29 (e.g., signal PK is stored as PKM, signal CK is stored as CKM, signal PL is stored as PLM, and CL is stored as CLM, in memory 29).

However, if the pressing plate is in a closed state, the values stored in the registers 25 and 26 are not written into the memory 29. This is because, if the pressing plate is in a closed state within a predetermined angle, there is a probability that the values stored in the registers 25 and 26 are incorrect and the size of the manuscript document cannot typically be accurately detected. Since the pressing plate is usually white and the color thereof is same as that of the background of the manuscript document, on many occasions, if the pressing plate is not opened wider than the predetermined angle, the manuscript document and the pressing plate cannot be distinguished definitively and the size of the manuscript document typically cannot be accurately detected.

When the operational calculation processing circuit 33 reads value(s) stored in the memory 29, the circuit 33 converts the values of the encoder output PKM and PLM to values equivalent to a counting value of the clock signal by multiplying those values by a coefficient N. In a case where the values PKM and PLM are smaller than a predetermined value PT, the value of N is set to N1 (i.e., N=N1). On the other hand, when the values are large than PT, the value of N is set to N2 (i.e., N=N2). In addition, the values N1 and N2 can be optionally set by the switching circuits 31 and 32, respectively. Now, assuming that PKM<PT<PLM, a value S is obtained by the following equation:

$$S=\{N1 \times PT + N2 \times (PLM-PT) + CLM\} - (N1 \times PKM + CKM),$$

wherein a size of the manuscript document 3 is determined by comparing the value S with data LIB stored in the ROM 30.

According to the above-described invention, the resolution of the encoder is limited to the extent of tolerable precision due to the rotational unevenness of the motor, resulting in a system having accurate document detection and reduced cost. Furthermore, the resolution necessary for measuring the position of the scanning light is compensated by employing a counting value of the clock signal.

In the above-described invention, however, the counting value of the standard signal (output from the encoder) and the counting value of the clock signal typically render processing more complicated. However, in order to improve such complications, one count part of the encoder output is replaced by the calculated count parts N of the clock signal, if the rotational unevenness of the motor does not exist. Thereby, the value of measuring the position of the scanning light can be converted to only the counting value of the clock signal, and thereby the processing can be facilitated.

In addition, in the above-described invention, if error in the equipment, such as mounting of components and inaccuracy of respective parts, is not suppressed to a predetermined range, shifting of the scanning orbit increases and thereby the detection thereof typically cannot be performed. However, even though the scanning orbit may shift, this can be compensated for by adequately changing the value N.

Specifically, the shifting of the scanning orbit is not uniform on many occasions. In this case, if the value N is changed (i.e., corrected) to a value during a series of scans, a section where a detection error increases may appear. However, the value N can be set per each of the respective scanning sections and thereby optimum compensation can be typically achieved.

Furthermore, in the above-described invention, typically it is necessary to start the position of scanning on the manuscript document mounting stand within an area with predetermined accuracy. In this case, there maybe a problem wherein accuracy of positioning and a margin (i.e., tolerance) of respective parts are required. However, even though the start position of scanning may become uneven (i.e., non-uniform), according to the present invention such unevenness typically does not influence a detection of position and size of the manuscript document.

Additionally, in the above-described invention, even though to some extent the motor may exhibit a rotational unevenness, it is possible to use such a motor resulting in reduced system cost. Furthermore, since complicated control, is not required, system cost is further reduced. Also, the structure of the processing system can be simplified, and reduced in size and cost. In addition, detection error due to the shifting of the scanning orbit is easily compensated.

Moreover, in the above-described invention, typically it is not necessary to precisely set a relationship between a position of the scanning light and the encoder output, resulting in system simplification. In addition, since the position of the manuscript document and can be obtained by a relative difference between the manuscript document end position and the predetermined position as a standard position on the same scanning orbit, influence due to a rotational unevenness of the motor can be further suppressed and thereby the accuracy of document detection can be further improved.

Figure 9:
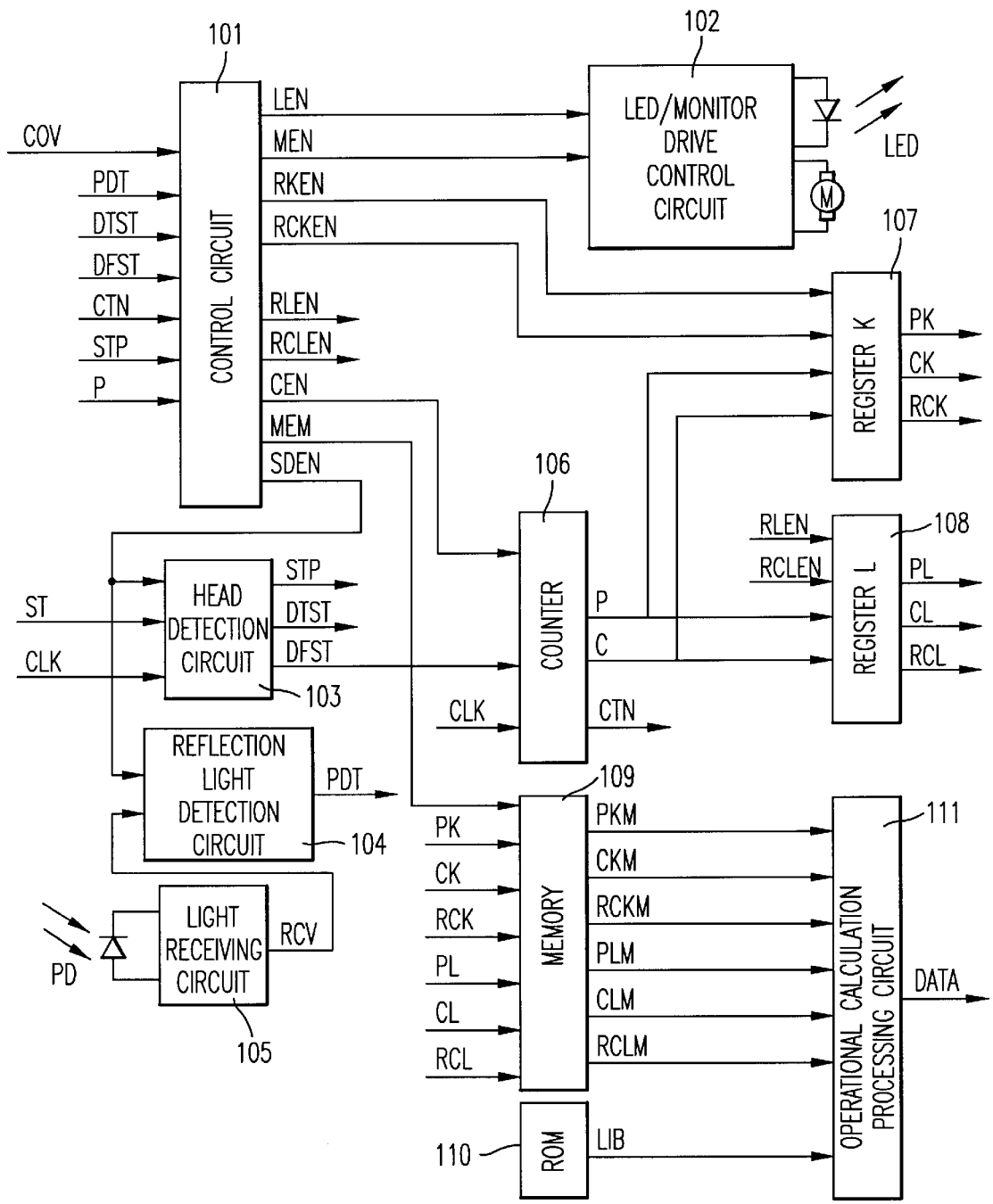
FIG. 9 is a circuit diagram illustrating another embodiment of the manuscript document detecting system according to the present invention.

FIG. 9 is a circuit diagram illustrating another embodiment of the manuscript document detecting system according to the present invention. In FIG. 9, the system includes a control circuit 101 for performing overall system control, an LED/Motor drive control circuit 102 for driving and controlling (i) a manuscript document scanning light source LED which functions as a signal generating medium, and (ii) a drive motor for use in light scanning, a head detection circuit 103 for detecting a rotation of the drive motor, a reflection light detection circuit 104 for measuring reflected light, a light receiving circuit 105 for receiving reflected scanning light, a counter 106, an X register 107, an L register 108, a memory 109, a ROM 110, and processing circuit 111 for performing processing calculations.

Figure 10:
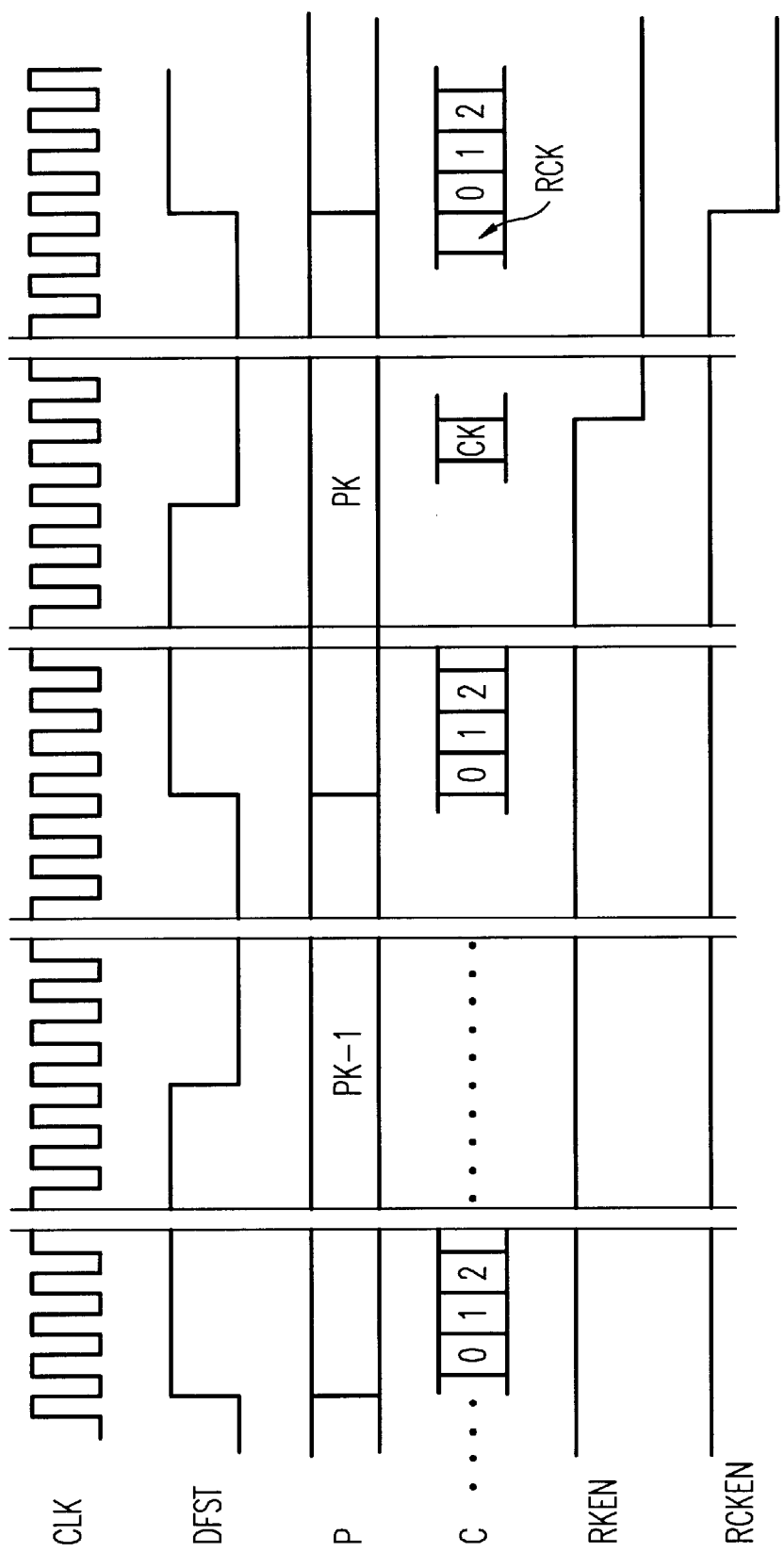
FIG. 10 is a timing diagram illustrating signal relationships in the embodiment of the manuscript document detecting system shown in FIG. 9.

FIG. 10 is a timing diagram illustrating signal relationships between the output of the counter 106 and data registered in register 107. The operation of the manuscript document detecting system as described above will now be described with references to FIGS. 9 and 10.

In FIG. 9, when the control circuit 101 determines that the device for holding down the manuscript document (e.g., a pressing plate) is in an open state via a signal COV, the circuit 101 generates a logic "H" on signal lines LEN and MEN which starts an operation of the LED/Motor drive control circuit 102. When the signal LEN is at a logic "H", the circuit 102 performs the ON-OFF driving of the LED with a predetermined period and duty cycle ratio of 25%, and causes the motor to rotate.

The control circuit 101 generates a logic "H" on signal line SDEN which starts the operation of the head detection circuit 103 and the reflection light detection circuit 104. Once started, the head detection circuit 103 detects a first rising-edge transition on the encoder output signal ST after a logic "L", not shorter than a predetermined time T10 is detected thereon. Upon such occurrence, circuit 103 generates a logic "H" on the signal line DTST. When the signal DTST is driven to a logic "H", circuit 103 maintains this level until the signal SDEN is driven to a logic "L". The signal ST is synchronized with the clock signal CLK and output as the signal DFST by circuit 103.

Furthermore, the head detection circuit 103 detects motor rotation and generates a logic "H" on the signal line STP to stop the motor from rotating, in a case when either a logic "L" level not shorter than the time period T10 and a pulse value not smaller than a predetermined number M cannot be detected. When the signal STP is at a logic "H", the control circuit 101 generates a logic "L" on the signal line MEN which stops the driving of the motor, and starts the motor during a predetermined time period. Moreover, the control circuit 101 also generates a logic "L" the signal lines CEN and SDEN which initializes the system.

The light receiving circuit 105 converts the light received by the photo diode PD to an electric signal, amplifies and outputs the converted electric signal binarized with a predetermined threshold value. Namely, if the received signal exceeds a threshold value, the circuit 105 generates a logic "H" on the signal line RCV. The reflection light detection circuit 104 detects the level of the signal RCV with a frequency which is four times that of the LED driving frequency during a time period when the signal SDEN is at a logic "H". When the light receiving circuit 105 detects a repetition pattern of, for example, "H, L, L, L, H, . . . ", the circuit 105 determines that the repetition pattern is due to reflected light of the LED (light) from the manuscript document, and generates a logic "H" on the signal line PDT during a light receiving period.

When the signal DTST is at a logic "H", the control circuit 101 generates a logic "H" on the signal line CEN and starts the operation of the counter 106. The counter 106 counts rising-edge transitions of the signal DFST and the clock signal CLK, and outputs respective counting value signals P and C as shown in FIG. 10. In FIG. 10, the counting value C of the CLK signal is cleared to zero each time the counting value P of the signal of DFST is incremented, and the counting of the clock signal via signal C then resumes.

Furthermore, when the signal DTST becomes a logic "H", the control circuit 101 generates a logic "H" on the signal lines RKEN, RCKEN and RCLEN which allows the P and C count values of the counter 24 to be written into registers 107 and 108. The register K 107 includes one or more registers for storing values of P and C during a time period when the signal RCKEN is at a logic "H".

When the control circuit 101 detects that the signal DTST is at a logic "H" and a first falling-edge transition of the signal PDT, the control circuit 101 generates a logic "L" on the signal line RKEN. At this time, the immediately preceding values of P and C are respectively registered as PK and CK in the register 107. Next, the control circuit 101 generates a logic "L" on the signal line RCKEN at the first rising-edge transition of the signal DFST after the signal RKEN is at a logic "L" as shown in FIG. 10. At this time, the immediately preceding value of C is registered as RCK in the register 107. Similarly, the register 108 is controlled by circuit 101 via signal lines RLEN and RCLEN in a similar manner as register 107.

After the transition of the signal RKEN to a logic "L", the control circuit 101 detects the next rising-edge transition of the signal PDT, and then generates a logic "L" on the signal line RLEN which registers the immediately preceding values of P and C as PL and CL in register 108. The control circuit 101 then generates a logic "L" on the signal line RCLEN at the next rising-edge transition of the signal DFST which registers the immediately preceding value of C as RCL in register 108. As previously noted, the operation of register 108 is similar to that of register 107.

In the case when a logic "H" level on the signal PDT is asserted, even though the counter 106 output P reaches a predetermined value, the control circuit 101 generates a logic "L" on the signals RKEN and RLEN, and on the signals RCKEN and RCLEN at a next rising-edge transition of signal DFST.

When the counter 106 counts (n−1) rising-edge transitions of the signal DFST, the counter 106 generates a logic "H" on the signal line CTN which causes the control circuit 101 to generate a logic "L" on the signals CEN and SDEN, initializing the circuits 103–106, etc. Furthermore, at this time, the control circuit 101 generates a logic "H" pulse on the signal line MEM when the pressing plate is opened and stores the values stored in the register 107 and 108 in the memory 109 (i.e., PK is stored as PKM, CK is stored as CKM etc.). Furthermore, at this time, in a case where the pressing plate is in an open state, circuit 101 pulses a logic "H" on the signal line MEM and the values stored in the registers 107 and 108 are stored in the memory 109 (e.g., signals PK, CK, RCK, PL, CL, and RCL are stored respectively as PKM, CKM, RCKM, PLM, CLM, and RCLM in memory 109). On the other hand, when the pressing plate is closed, the writing operation into the memory 109 is not performed.

Next, the operational calculation processing circuit 111 reads the values stored in the memory 109, and then compensates the clock counting values CKM and CLM, respectively, by RCKM and RCLM. Thereafter, the encoder output counting value PKM and the signal PLM are multiplied by a coefficient N, and thereby converted to values equivalent to counting values of the clock signal. Namely, assuming that CKM·N/RCKM→CKM; CKM·N/RCLM→CLM), the value obtained by the following equation:

$$S=N*PLM+CLM-N*PKM+CKM,$$

is compared with the data stored in ROM 110 to thereby determine the size of the manuscript document mounted on the surface of the contact glass.

Figure 11:
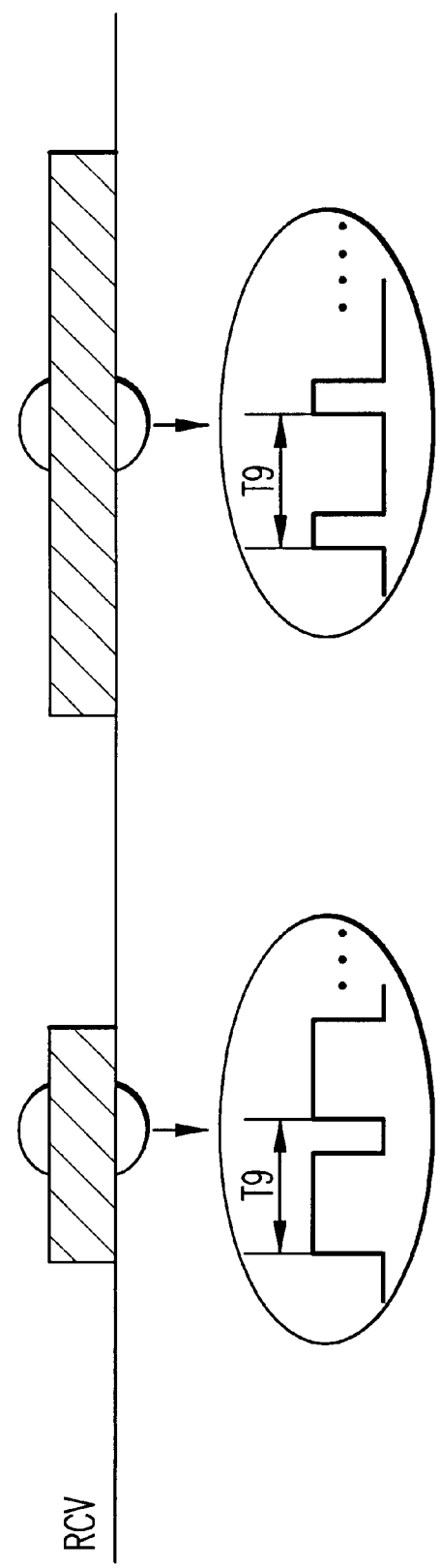
FIG. 11 is a timing diagram illustrating a light-receiving signal, output at a time of setting a duty cycle ratio, in the manuscript document detecting system and method according to the present invention.
Figure 12:
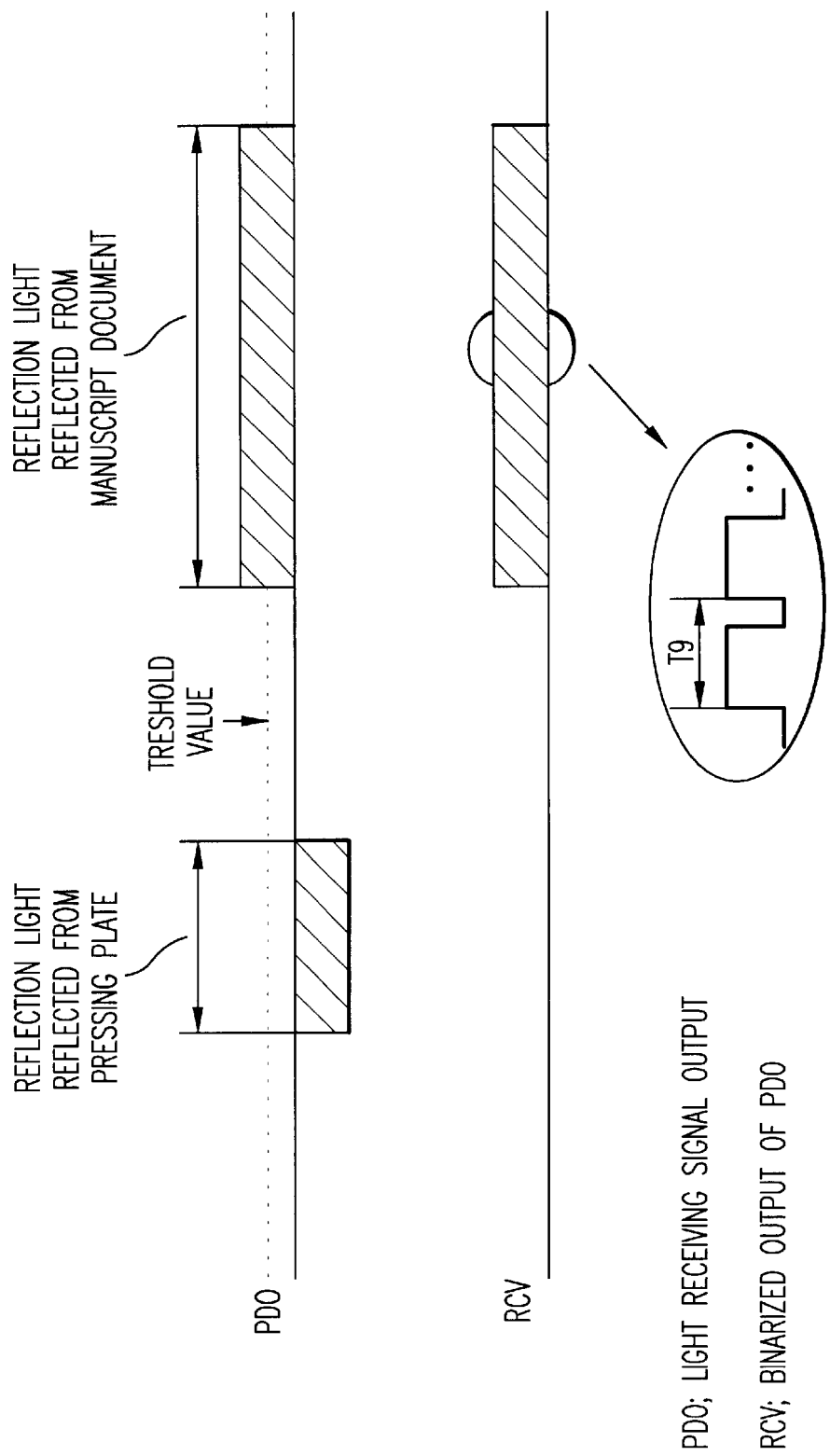
FIG. 12 is a timing diagram illustrating a light-receiving signal without reflected light disturbances.
Figure 13:
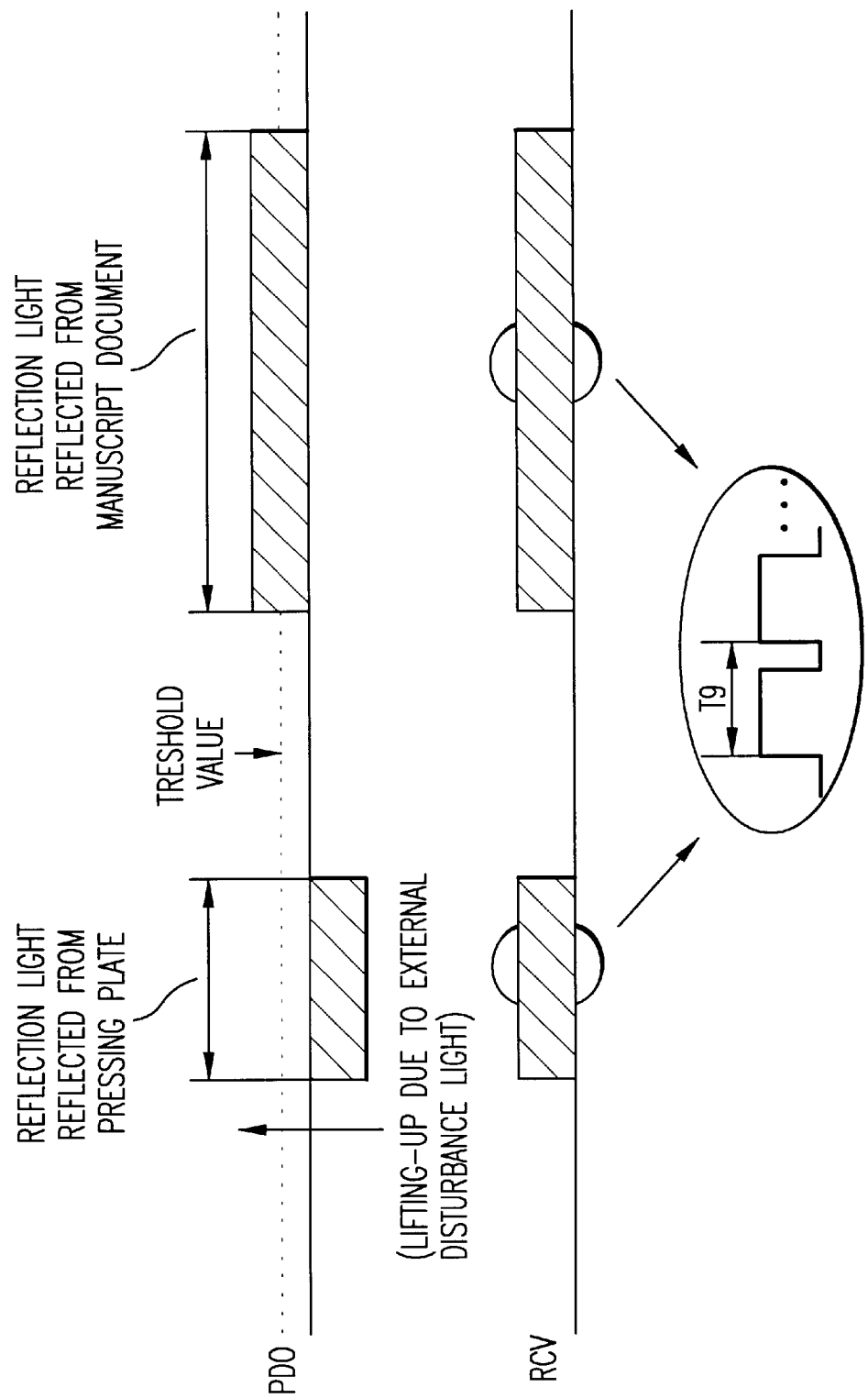
FIG. 13 is a timing diagram illustrating a light-receiving signal with reflected light disturbances.

As shown in, for example, FIG. 11, according to the present invention, in case that the scanning light is driven, for instance, with a 25% duty cycle, if the light-receiving output signal RCV based on the reflected light from the manuscript document, etc. is also driven with a 25% duty cycle, the duty cycle ratio of the light-receiving output based on the reflected light disturbance from the pressing plate being lifted becomes 75%, and the reflected light from the manuscript document can be distinguished from the disturbance light. Consequently, it is possible to (i) realize precise detection of the manuscript document, while avoiding detection errors due to the disturbance light, (ii) prevent miscopying, and (iii) save expensive resources.

In addition, according to the present invention, since the control operation is performed by obtaining the rotation information of the motor by use of only one motor rotation detecting device, the system cost is reduced.

Furthermore, according to the present invention, the rotational unevenness between the encoder pulses is measured, and the counting value of the clock for supplementing the respective pulses between the pulses of the encoder is compensated on the basis of the measurement result. As the result, even though rotational unevenness of the motor may occur, it is possible maintain detection precision.

Moreover, according to the present invention, in the special case that a large manuscript document, such as newspaper, poster, etc., wider than the contact glass, is mounted an the manuscript document mounting stand (contact glass), the light-receiving time period is measured. When the light-receiving period exceeds a predetermined time, it is possible to treat the manuscript document as a predetermined document size, for instance, as a maximum manuscript document size. Consequently, the system compensates for the above-mentioned case.

Still further, according to the present invention, since the disturbance light of high frequency can be detected, if the light-receiving signal is of a certain predetermined frequency, document mis-detection can be avoided, and thereby the reliability of detecting the manuscript document can be improved.

The mechanisms and processes set forth in the present description may be implemented using a conventional general purpose microprocessor programmed according to the teachings in the present specification, as will be appreciated to those skilled in the relevant art(s). Appropriate software coding can readily be prepared by skilled programmers based on the teachings of the present disclosure, as will also be apparent to those skilled in the relevant art(s).

The present invention thus also includes a computer-based product which may be hosted on a storage medium and include instructions which can be used to program a computer to perform a process in accordance with the present invention. This storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

This document claims priority and contains subject matter related to Japanese Patent Application Nos. 09-186239, filed Jul. 11, 1997, and 09-179092 filed on Jun. 20, 1997, the contents of both of which are incorporated herein by reference.

What is claimed as new and desired to be secured by Letters Patent of the United States is:

1. A manuscript document detecting system, comprising:
a scanning light radiating means for radiating scanning light toward a manuscript document;
a reflected light detecting means for detecting scanning light reflected from said manuscript document; and
a pulse signal generating means for generating a pulse signal representing a scanning position of said scanning light;
wherein an end portion of said manuscript document is detected based on said reflected light, and at least one of a size and a position of said manuscript document is detected based on said pulse signal;
said pulse signal generating means generates said pulse signal representing a start of light scanning and representing a position of said scanning light after starting the scanning operation per each of respective predetermined time intervals, and generates a clock signal oscillating with a constant time period shorter than that of said pulse signal for measuring said predetermined time intervals; and
the position of said scanning light is calculated as a function of both a count value of said pulse signal and a count value of said clock signal.

2. The manuscript document detecting system as defined in claim 1, wherein the manuscript document detecting system includes means for multiplying the count value of said pulse signals by a predetermined coefficient and then converting the multiplied count value of said pulse signals to the count value of said clock signal.

3. The manuscript document detecting system as defined in claim 2, wherein the means for multiplying includes means for making said predetermined coefficient variable.

4. The manuscript document detecting system as defined in claim 2, wherein the means for multiplying includes means for generating said predetermined coefficient for multiplying the count value of said pulse signals per each of respective sections in a scanning area of said scanning light divided into a predetermined number of sections and means for making said predetermined coefficient variable.

5. The manuscript document detecting system as defined in claim 3, wherein the means for multiplying includes means for generating said coefficient for multiplying the count value of the number of said pulse signals per each of respective sections in a scanning area of said scanning light.

6. A manuscript document detecting system, comprising:
a scanning light radiating means for radiating scanning light toward a manuscript document;
a reflected light detecting means for detecting scanning light reflected from said manuscript document; and
a scanning light reflecting section for reflecting said scanning light onto a predetermined position where relative positional relationship is ensured for the manuscript document placed at a standard position on a scanning orbit of said scanning light;
wherein at least one of a size and a position of said manuscript document is detected by measuring a relative light receiving timing between reflected light from said scanning light reflecting section and reflected light from said manuscript document.

7. A method of detecting a manuscript document, comprising the steps of:
radiating scanning light toward said manuscript document;
detecting scanning light reflected from said manuscript document;
generating a pulse signal representing a scanning position of said scanning light;
detecting an end portion of said manuscript document based on said reflected light, and detecting at least one of a size and a position of said manuscript document based on said pulse signal;
generating said pulse signal representing a start of light scanning and representing the position of the scanning light after starting a scanning operation per each of respective predetermined time intervals;
generating a clock signal oscillating with a constant time period shorter than that of said pulse signal for measuring said predetermined time intervals; and
calculating the position of said scanning light as a function of both a count value of said pulse signal and a count value of said clock signal.

8. The method of detecting said manuscript document as defined in claim 7, further comprising the steps of:
multiplying the count value of said pulse signals by a predetermined coefficient; and
converting the multiplied count value to the count value of said clock signals.

9. The method of detecting said manuscript document as defined in claim 8, further comprising the step of:
making variable said coefficient for multiplying the count value of the number of said pulse signals.

10. The method of detecting said manuscript document as defined in claim 8, further comprising the steps of:
generating said coefficient for multiplying the count value of said pulse signals per each of respective sections in a scanning area of said scanning light divided into predetermined number of sections; and
making said coefficient variable.

11. The method of detecting said manuscript document as defined in claim 9, further comprising the step of:
generating said coefficient for multiplying the count value of said pulse signals per each of respective sections in a scanning area of said scanning light.

12. A method of detecting a manuscript document, comprising the steps of:
radiating scanning light toward a manuscript document;
detecting scanning light reflected from said manuscript document;
reflecting said scanning light onto a predetermined position where relative positional relationship is ensured for the manuscript document placed at a standard position on a scanning orbit of said scanning light; and
detecting at least one of a size and a position of said manuscript document by measuring a relative light receiving timing between reflected light from a scanning light reflecting section and reflected light from said manuscript document.

13. A manuscript document detecting system, comprising:
a control means for generating a first light receiving signal of a first polarity obtained by light reflected from an object at a side of a manuscript document for a focal distance established on an upper part of a manuscript document mounting stand, for generating a second light receiving signal of a second polarity obtained by light reflected from an object located at a more remote position than said focal distance, and for mutually outputting said first and second light receiving signals having opposite polarities for a predetermined level; and
a light source for generating scanning light;
wherein at least one of a size and a position of said manuscript document is detected based on a result of detecting said first light receiving signal of said first polarity;
the light source for generating scanning light is turned on and off or power-modulated with a predetermined period and duty cycle ratio excluding 50%; and
at least one of a size and a position of said manuscript document is detected based on the second light receiving signal coinciding with said predetermined period and duty cycle ratio.

14. The manuscript document detecting system as defined in claim 1, further comprising:
a motor;
a light emitting source;
an optical system for directing light from the light emitting source onto a manuscript document and optically scanning said manuscript document based on a rotation of said motor;
a signal generating means for generating a pulse train having a predetermined pulse period $T4$ within a count period $T2$ during a rotation period $T1$ of said motor, and for generating a signal of a constant level in a period $T3$ less than or equal to period $T1$ minus period $T2$ ($T3<T1-T2$), said signal representing a start of scanning and a scanning light position;
a motor rotation detecting means for determining a rotation of said motor during a period $T10$ ($T4<T10<T3$) in said period $T1$, and thereafter for counting a pulse of a predetermined number $M$ ($T1/T10<M<T2/T4$); and
a control means for temporarily stopping a drive of said motor in a case of said motor rotation detecting means not detecting a rotation of said motor, and thereafter driving said motor.

15. The manuscript document detecting system as defined in claim 14, further comprising:
a counting means in which a time interval of said predetermined pulse period $T4$ is supplemented with a counting value by use of a clock signal of a predetermined period shorter than said predetermined period $T4$, the position of said scanning light is measured by a pulse counting value $P$ of said signal and a counting value $C$ of said clock signal, and in a case that a the values $P$ and $C$ are:
$P=Px$ and $C=Cx$, and
a time internal when the measuring value $P$ transitions from $Px$ to $(Px+1)$ is counted with said clock signal;
wherein, assuming that said counting value $C$ becomes $Cr$, said control means processes said value $Cx$ in accordance with:

$$Cx \cdot N/Cr \rightarrow Cx,$$

where $N$ is a constant.

16. A manuscript document detecting system, comprising:
a manuscript document mounting stand;
a reflecting portion, for reflecting scanning light, provided on a predetermined position of said manuscript document mounting stand so as ensure a relative positional relationship of mounting a manuscript document;
means for radiating scanning light toward said manuscript document placed on said manuscript document mounting stand;
means for measuring a difference of relative light receiving timing between reflected light from said reflecting portion and reflected light from said manuscript document;
means for detecting at least one of a size and a position of said manuscript document as a function of the measured difference of the relative light receiving timing;
a reflected light measuring means for measuring a light receiving period of the light reflected from the reflecting portion; and
a control means for executing a control operation such that the manuscript document is processed as a predetermined manuscript document size when the light receiving period exceeds a predetermined time period.

17. A manuscript document detecting system, comprising:
means for switching scanning light on and off so as to power-modulate said scanning light with a predetermined period, and for radiating said scanning light towards a manuscript document;

a light receiving means for optoelectrically converting said switching scanning light and incident light and for amplifying and binarizing the optoelectrically converted scanning light to form a binarized light receiving signal;

means for detecting the binarized light receiving signal coinciding with said predetermined period and for detecting at least one of a size and a position of said manuscript document;

an operational calculation processing means in which a monitoring time longer than said predetermined period is previously set and, when a high or low level logic larger than a predetermined width is not detected during said monitoring time in the binarized light receiving signal, said binarized light receiving signal is processed as disturbance light.

18. A method of detecting a manuscript document, comprising the steps of:

scanning a manuscript document mounted on a mounting stand from a lower side thereof;

mutually outputting, with opposite polarities, for a predetermined level, a first light receiving signal of a first polarity obtained by light reflected from an object at a side of said manuscript document for a focal distance established on an upper part of said manuscript document mounting stand, and second light receiving signal of a second polarity obtained by light reflected from an object located at a more remote position than said focal distance;

detecting at least one of a size and a position of said manuscript document based on a result of detecting only said first light receiving signal of first polarity;

turning on and off or power-modulating a light source for generating scanning light with a predetermined period and duty cycle ratio excluding 50%; and detecting at least one of a size and a position of said manuscript document based on a light receiving signal coinciding with said predetermined period and duty cycle ratio.

19. The method of detecting the manuscript document as defined in claim 18, further comprising the steps of:

optically scanning a part or all of an optical system, for directing light from a light emitting source onto the manuscript document mounting stand, by action of rotation of a motor;

generating a pulse train having a predetermined pulse period T4 within a count period T2 during a rotation period T1 of said motor, and generating a signal of a constant level in a period T3 less than or equal to period T1 minus period T2 (T3<T1−T2), said signal representing a start of scanning and a scanning light position;

determining a rotation of said motor by detecting a constant level during a period T10 (T4<T10<T3) in said period T1 and thereafter counting a pulse of a predetermined number M (T1/T10<M<T2/T4); and temporarily stopping a drive of said motor in a case of not detecting a rotation of said motor, and thereafter driving said motor.

20. The method of detecting the manuscript document as defined in claim 19, further comprising the steps of:

supplementing the time interval of said predetermined pulse period T4 with a counting value by use of a clock signal of a predetermined period shorter than said predetermined period T4;

measuring a position of said scanning light based on a pulse counting value P of said signal and a counting value C of said clock signal;

counting a time internal when the value P transitions from Px to (Px+1) with said clock signal in a case that the values P and C are:

P=Px and C=Cx; and supplementarily processing said value Cx in accordance with:

$$Cx \cdot N/Cr \rightarrow Cx,$$

where N is a constant, assuming that said counting value C becomes Cr.

21. A method of detecting a manuscript document, comprising the steps of:

providing a reflecting portion, for reflecting scanning light, on a predetermined position of a manuscript document mounting stand so as ensure a relative positional relationship of mounting a manuscript document;

radiating scanning light toward said manuscript document placed on said manuscript document mounting stand;

measuring a difference of relative light receiving timing between reflected light from said reflecting portion and reflected light from said manuscript document;

detecting at least one of a size and a position of said manuscript document based on the measured difference of the relative light receiving timing;

measuring a light receiving period of the light reflected from the reflecting portion; and executing a control operation such that the manuscript document is processed as a predetermined manuscript document size when the light receiving period exceeds a predetermined time period.

22. A method of detecting a manuscript document, comprising the steps of:

switching scanning light on and off so as to power-modulate said scanning light with a predetermined period;

radiating said scanning light towards a manuscript document;

optoelectrically converting said switching scanning light and incident light;

amplifying and binarizing the optoelectrically converted scanning light to form a binarized light receiving signal;

detecting the binarized light receiving signal coinciding with said predetermined period;

detecting at least one of a size and a position of said manuscript document;

previously setting a monitoring time longer than said predetermined period; and processing said binarized light receiving signal as disturbance light, when a high or low level logic larger than a predetermined width is not detected during said monitoring time in the binarized light receiving signal.

23. The system of claim 6, wherein said scanning light reflecting section comprises a reflective material placed on one of said manuscript document and a manuscript document mounting stand.

24. The method of claim 12, wherein said step of detecting at least one of a size and a position of said manuscript document comprises measuring said reflected light from said scanning light reflecting section comprising a reflective material placed on one of said manuscript document and a manuscript document mounting stand.

25. The system of claim 16, wherein said reflecting portion comprises a reflective material placed on said manuscript document mounting stand.

26. The method of claim 21, wherein said step of providing said reflecting portion comprises providing said reflecting portion comprising a reflective material placed on said manuscript document mounting stand.

* * * * *